(12) United States Patent
Hesse

(10) Patent No.: US 6,962,386 B2
(45) Date of Patent: Nov. 8, 2005

(54) ROOF STORAGE COVER FOR A CONVERTIBLE VEHICLE

(75) Inventor: Jan Hesse, Gechingen (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/866,504

(22) Filed: Jun. 12, 2004

(65) Prior Publication Data
US 2005/0012356 A1    Jan. 20, 2005

(30) Foreign Application Priority Data
Jul. 14, 2003   (DE) ............................... 103 31 987

(51) Int. Cl.⁷ ................................................ B60J 7/08
(52) U.S. Cl. ..................................... 296/107.8; 296/76
(58) Field of Search ............................. 296/107.08, 76

(56) References Cited

U.S. PATENT DOCUMENTS

2002/0036413 A1 * 3/2002 Neubrand et al. ..... 296/107.08
2002/0171258 A1 * 11/2002 Obendiek .............. 296/107.08
2004/0145210 A1 * 7/2004 Fuchs et al. ........... 296/107.08
2004/0178656 A1 * 9/2004 Hahn ..................... 296/107.08

FOREIGN PATENT DOCUMENTS

| DE | 196 50 402 | 6/1998 |
| DE | 101 17 767 | 10/2002 |
| DE | 101 34 369 | 1/2003 |
| DE | 101 62 303 | 7/2003 |

* cited by examiner

Primary Examiner—Lori L. Coletta
(74) Attorney, Agent, or Firm—Klaus J. Bach

(57) ABSTRACT

In a roof storage compartment cover for a storage compartment for a vehicle roof, which is movable between a closed position, in which it covers an interior vehicle space, and an open position, in which the roof is deposited in the storage compartment by a roof operating mechanism, the storage compartment cover is operable by a compartment cover operating mechanism which is mechanically linked to the roof operating mechanism by an over-dead-center operating structure, which, upon movement of the vehicle roof between the closed and storage positions, first raises the storage compartment cover to permit passage of the roof and then closes the storage compartment cover again.

7 Claims, 3 Drawing Sheets

ROOF STORAGE COVER FOR A CONVERTIBLE VEHICLE

BACKGROUND OF THE INVENTION

The invention resides in a roof storage compartment cover for convertible vehicle wherein the roof storage compartment cover is pivotally supported on a vehicle body and is movable between closed and open positions by a cover operating mechanism which is mechanically coupled to the roof operating mechanism by way of an over-dead center structure by way of which the direction of movement of the vehicle roof is reversed during the transfer from the closed position to the storage position so that the storage compartment cover is closed when the vehicle roof is in the closed position and also when it is deposited in the storage compartment.

DE 196 50 402 A1 discloses a roof storage compartment for a removable vehicle folding roof which is disposed in the rear of a vehicle and can be closed by a roof storage compartment cover, but which can be opened for depositing the folding roof in the storage compartment and for lifting it out of the storage compartment. The storage compartment cover is coupled to the storage compartment structure by way of a four-link operating mechanism and is opened and closed by means of a hydraulic actuator. The hydraulic actuator is controlled depending on the control for the roof operating mechanism such that the movement of the roof and the movement of the storage compartment cover are electronically coupled. This however requires separate actuators for the movement of the vehicle roof and for the movement of the roof storage compartment cover.

DE 101 17 767 A1 discloses a roof storage compartment cover for a storage compartment accommodating a removable vehicle roof wherein the roof storage compartment cover is pivotally supported on the vehicle body and can be opened and closed by means of a compartment cover operating mechanism. The storage compartment cover operating mechanism is coupled to the roof operating mechanism by way of an over-dead center drive arrangement, so that, upon operation of the vehicle roof, the movement of the vehicle roof operating mechanism is transferred by way of the over-dead center drive arrangement to the storage compartment cover operating mechanism whereby the storage compartment cover is automatically opened and closed. During the transfer movement, the over-dead center drive arrangement passes a dead center position in which the movement of the storage compartment cover is reversed.

The arrangement however is highly complicated. Between the main operating arm of the roof operating mechanism and the roof storage compartment cover operating mechanism, a plurality of levers and links for the transfer of the movement are provided. The pivot movement of the main operating arm of the roof operating mechanism is transmitted by a pivotally supported lever to an intermediate lever which is pivotally connected to a coupling lever which again is supported on the vehicle body by a pivot joint. The coupling lever is pivotally connected to a transfer lever which is part of the roof storage compartment cover operating mechanism. For a kinematically clearly defined movement, another control lever is mounted on the vehicle body which is pivotally connected to the roof storage compartment cover operating mechanism.

Consequently, between the main operating arm of the roof, operating mechanism and the roof storage compartment cover, altogether six levers or, respectively, links are required for the movement control of the roof storage compartment cover. This involves substantial linkage and design expenses. In addition, the arrangement requires a substantial amount of space.

It is the object of the present invention to provide a roof storage compartment cover for a roof storage compartment in which a removable vehicle roof can be deposited wherby little construction expenses and little energy for its movement depending on the movement of the vehicle roof are required.

SUMMARY OF THE INVENTION

In a roof storage compartment cover for a storage compartment for a vehicle roof, which is movable between a closed position in which it covers an interior vehicle space and an open position in which the roof is deposited in the storage compartment by a roof operating mechanism, the roof storage compartment cover is operable by a compartment cover operating mechanism which is mechanically linked to the roof operating mechanism by an over-dead center operating structure which, upon movement of the vehicle roof between the closed and storage position, first raises the storage compartment cover to permit passage of the roof and then closes the storage compartment cover again.

As a result of the movement of the vehicle roof and reversal of the roof storage compartment cover, during the transfer of the vehicle roof the cover is first raised from its closed position to its maximum open position and subsequently again closed. During this movement of the roof storage compartment cover, the vehicle roof and the roof operating mechanism and the roof move only in one direction—without movement reversal. By way of the movement reversal of the roof storage compartment cover operating mechanism, the roof storage compartment cover is raised and then again closed, wherein, in the raised position of the storage compartment cover, the vehicle roof is lowered into the storage compartment or, respectively, raised out of the compartment. Because of the firm mechanical coupling between the roof operating mechanism and the roof storage compartment cover operating mechanism no energy consuming separate actuators and no complex electronic controls are required.

Expediently, the movement reversal is achieved by means of an over-dead center operating structure. The over-dead center operating structure between the components of the roof operating mechanism and the roof storage compartment cover operating mechanism comprises a transfer link which is pivotally connected with one end thereof to a component of the roof storage compartment cover operating mechanism and with its other end to an arm of the roof operating mechanism, particularly a main operating arm thereof, wherein the respective arm of the roof operating mechanism and the transfer link of the over-dead-center structure are in a dead center position when the roof storage compartment cover is in its open position. This dead center position is passed during the transfer movement of the vehicle roof from the closed position to the storage position wherein, upon passing the dead center position, the movement of the cover is reversed so that the storage compartment cover is returned from its raised position again to its closed position. The same occurs when the vehicle roof is raised out of the storage compartment wherein, upon closing the roof the dead center position is also passed and the initial opening movement of the storage compartment cover is reversed.

The operating arm of the roof operating mechanism to which the transfer link of the over-dead center operating structure is connected is expediently pivotally connected to the vehicle body. Also a control arm of the roof storage compartment cover operating mechanism to which the opposite end of the transfer link is connected is preferably pivotally supported on the vehicle body. Upon opening and closing the roof storage compartment cover the pivot movement of the control arm about its pivot joint on the vehicle body is reversed. The control arm is coupled with the roof storage compartment cover and therefore transfers its movement reversal to the storage compartment cover. The control arm raises the storage compartment cover until it reaches its dead center position. Upon passing the dead center position with the resulting movement reversal, the roof storage compartment cover is again closed by the control arm.

It may be expedient to provide on the roof storage compartment cover a slide structure, in which one end of the control arm is slidably guided. In a direction transverse to the slide structure operating forces are transferred from the control arm to the roof storage compartment cover, whereby the roof storage compartment cover is raised and again closed.

The roof storage compartment cover may comprise two sections which are arranged one behind the other in the longitudinal vehicle direction. The rear section, which is disposed adjacent the rear end of the vehicle may be pivotally connected to the front section and expediently be pivoted downwardly when the roof storage compartment cover is raised in order to obtain an open area which is as large as possible for the transfer of the vehicle roof between the closed and the storage positions. The relative movement of the rear section with respect to the front section occurs advantageously as a coupled movement depending on the opening and closing movement of the roof storage compartment cover.

Preferably, the roof storage compartment is part of the vehicle trunk. Expediently, the roof storage compartment cover forms an intermediate bottom within the trunk and, in the closed position, is disposed between the trunk bottom and the trunk lid. The space between the closed roof storage compartment cover and the trunk lid is available as luggage space when the roof is open and also when the roof is deposited in the storage compartment. In this way, the available trunk space is increased. The roof storage compartment cover may also be removable so that, especially when the vehicle roof is closed, the trunk is practically free of any components of the roof storage compartment and of the storage compartment cover and can be used in an optimal manner as trunk space.

Further expedient embodiments and advantages of the invention will be described below on the basis of the accompanying drawings.

DESCRIPTION OF PREFERRED EMBODIMENTS

Figure 1:
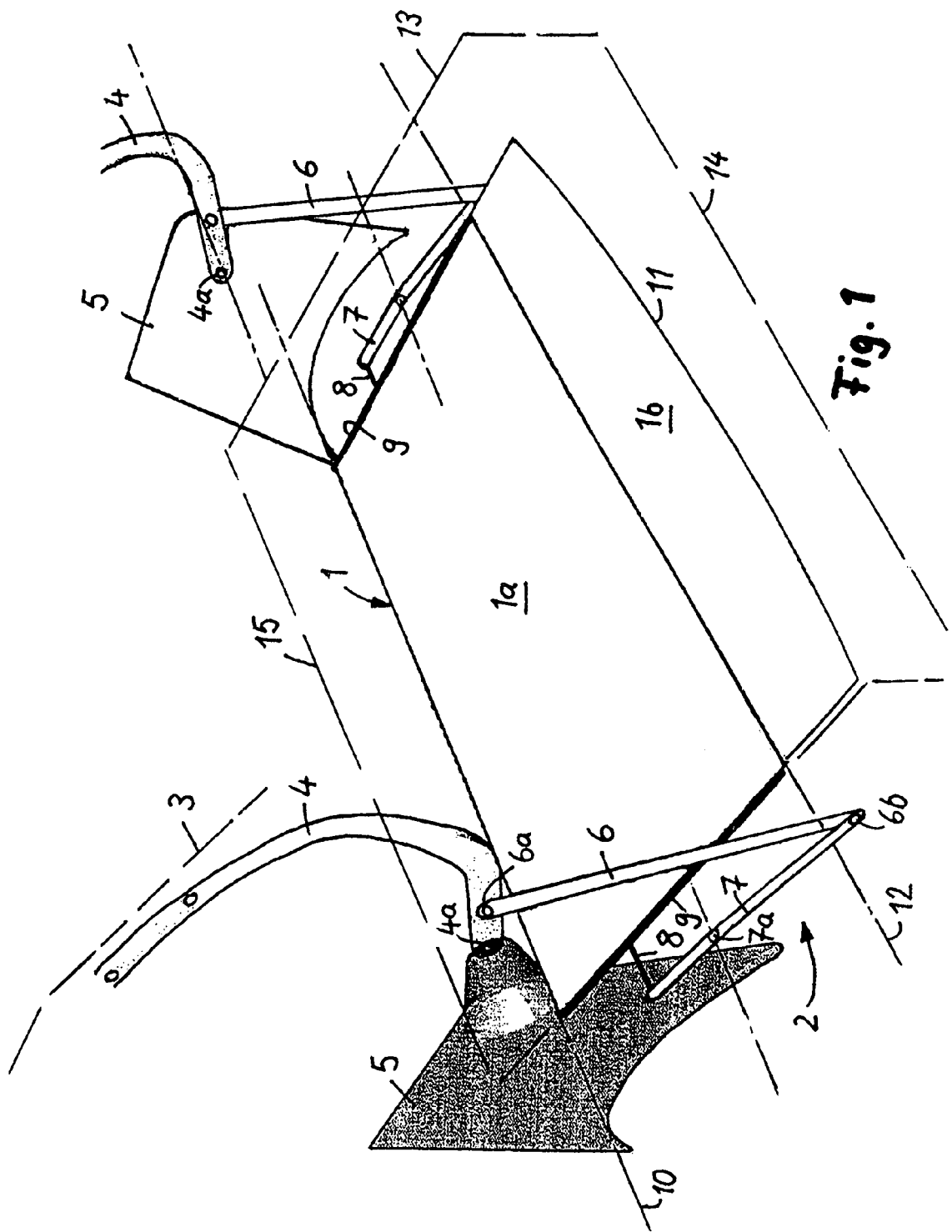
FIG. 1 is a perspective view of a cover of a roof storage compartment in which a vehicle roof can be deposited which is movable between a closed and a storage position.
Figure 2:
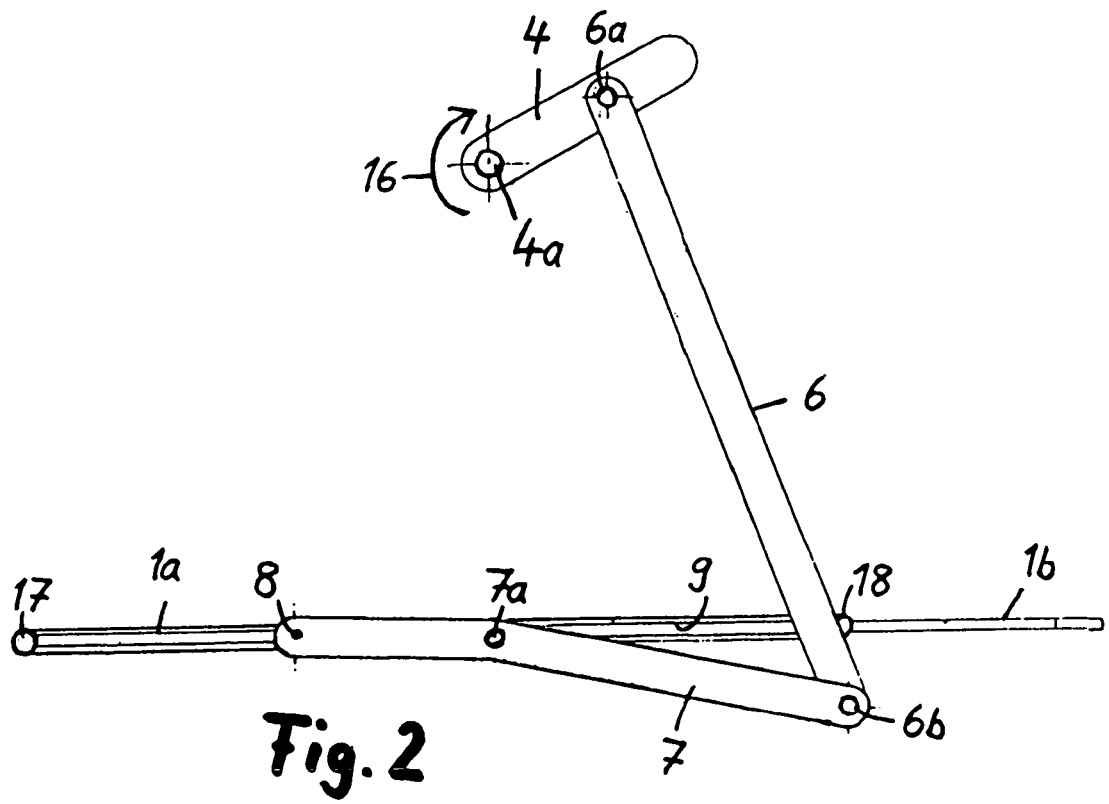
FIG. 2 shows the roof storage compartment cover in a closed position and also the roof storage compartment cover operating mechanism which is coupled with the vehicle roof operating mechanism.
Figure 3:
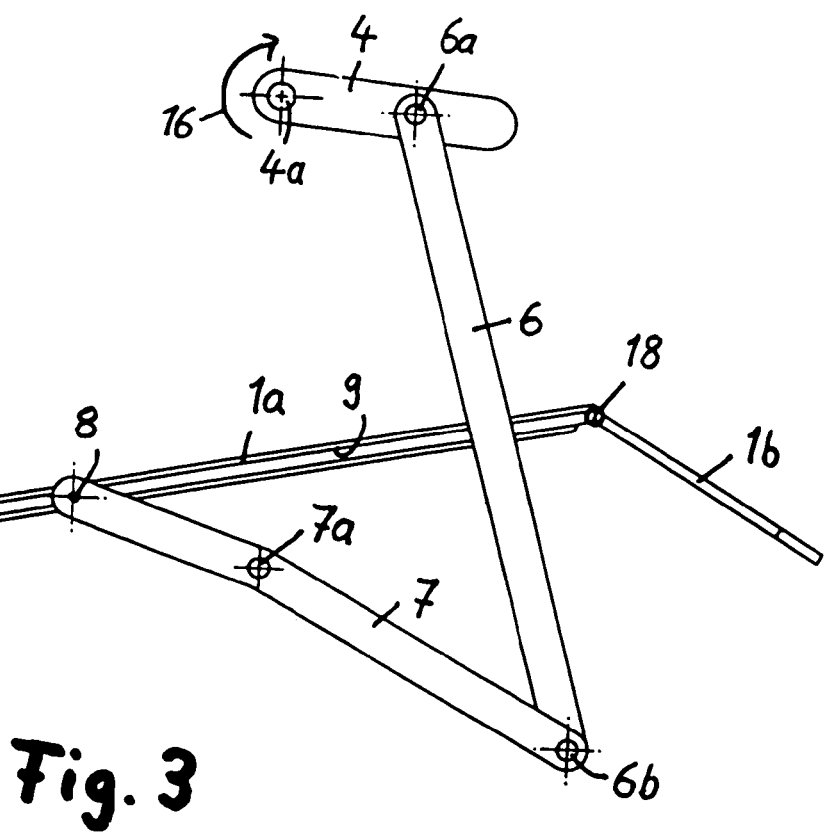
FIG. 3 shows the roof storage compartment cover in a first intermediate position during the transfer of the vehicle roof from a closed to a storage position.

Identical components are indicated in the figures by the same reference numerals.

In the closed position as shown in FIG. 1, the roof storage compartment cover 1 covers a roof storage compartment 2 in which a vehicle roof, which is movable between a closed position and an open cabriolet position, can be deposited in its open position. The roof storage compartment 2 is particularly part of a rear trunk of the vehicle that is it can be delimited by the side walls of the trunk. The vehicle roof 3 may be a hardtop comprising several rigid roof parts or a folding roof including a soft rag top material supported by a roof support linkage. The transfer of the vehicle roof 3 between a closed position and a storage position occurs by means of a roof operating mechanism of which in each of the left and in the right roof area, a main support arm 4 is shown which is pivotally supported on the vehicle body by a pivot joint 4a and is operated by an actuator which is not shown in the figure.

In the area of its front edge, the roof storage compartment cover 1 is to be pivoted open about a vehicle body based pivot axis 10 such that, in the open position of the roof storage compartment cover, the rear edge 11 is raised. The roof storage compartment cover 1 comprises two sections, a front section 19 disposed adjacent the vehicle interior which is pivotally supported directly on the vehicle body and a rear section 1b adjacent the rear end of the vehicle, which is pivotally connected to the front section along a pivot axis 12.

The roof storage compartment 2 including the roof storage compartment cover 1 is covered by a trunk lid 13 whose rear section 14 can be raised for loading and unloading the trunk. For depositing the vehicle roof, it is expedient to raise the front end 15 of the trunk lid 13. When the trunk lid 13 is closed, the roof storage compartment cover 1, which is disposed below the trunk lid 13, forms an intermediate bottom such that the space between the roof storage compartment cover 1 and the trunk lid 13 is usable as additional trunk space. For increasing the usable trunk space, it may be expedient to make the roof storage compartment cover fully removable so that, with the vehicle roof closed, the roof storage compartment cover 1 including its sections 1a and 1b can be removed from the trunk so that the trunk space is not reduced by any installations.

The roof storage compartment cover is mechanically coupled with the operating mechanism for the vehicle roof 3 so that, with the operation of the roof operating mechanism for transferring the roof between the closed and the storage positions, the storage compartment cover is automatically raised and again closed. The roof operating mechanism and the roof storage compartment cover operating mechanism are coupled by a transfer link 6, which at one end is connected by a joint 6a to the main operating arm 4 at a distance from the vehicle body support joint 4a and, at its other end, by way of another pivot joint 6b to an operating arm 7 of the roof storage compartment cover operating mechanism. The operating arm 7 is pivotally supported on the vehicle body by a pivot joint 7a. The pivot joint 7a is disposed at an intermediate area of the operating arm 7. At the end of the operating arm opposite the pivot joint 6a, a pin 8 is mounted to the operating arm 7 which extends transversely to the longitudinal axis of the operating arm 7 and into a slide guide path 9, which is formed in the area of the side edge at opposite sides of the front section 1a of the roof storage compartment cover 1.

The transfer link 6 which interconnects the roof operating mechanism and the roof storage compartment cover operating mechanism and the roof storage cover operating mechanism is part of an over-dead center operating structure which will be described in greater detail with reference to the following figures. With the over-dead center operating structure and the roof storage compartment cover operating mechanism a pivot movement of the main operating arm 4, which is part of the roof operating mechanism, during the transfer of the vehicle roof 3 from the closed position to the storage position is converted to a raising and again lowering movement of the roof storage compartment cover 1.

Figure 4:
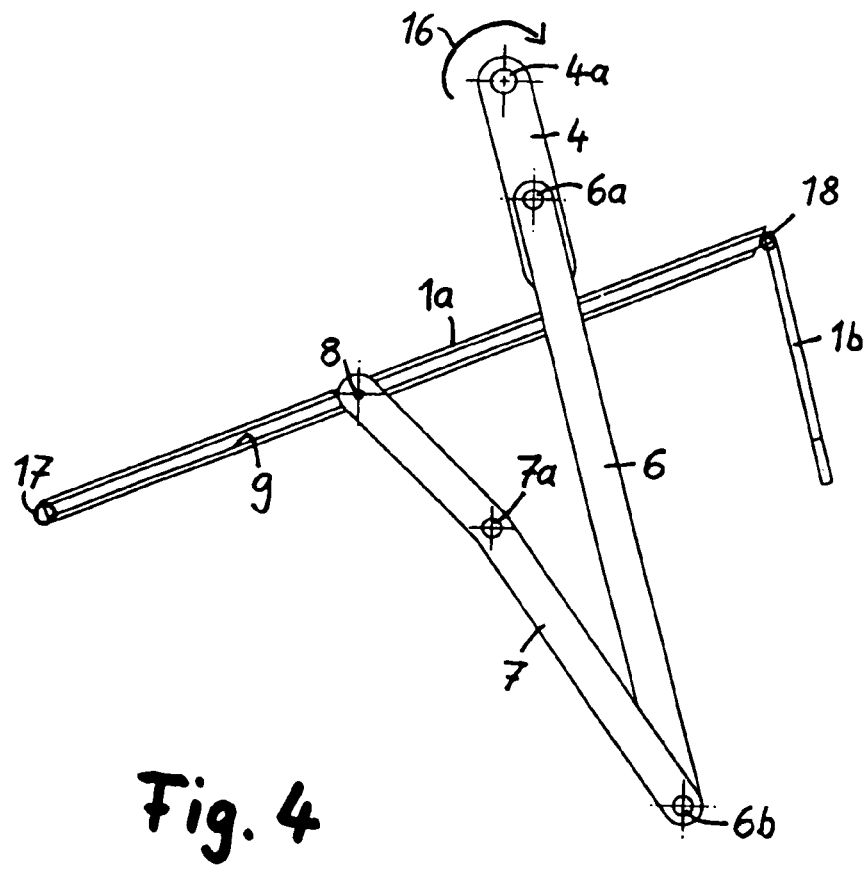
FIG. 4 shows the roof storage compartment cover in a further advanced intermediate position in which the cover is raised to the maximum level and the operating mechanism for the roof storage compartment cover is in the dead center position.
Figure 5:
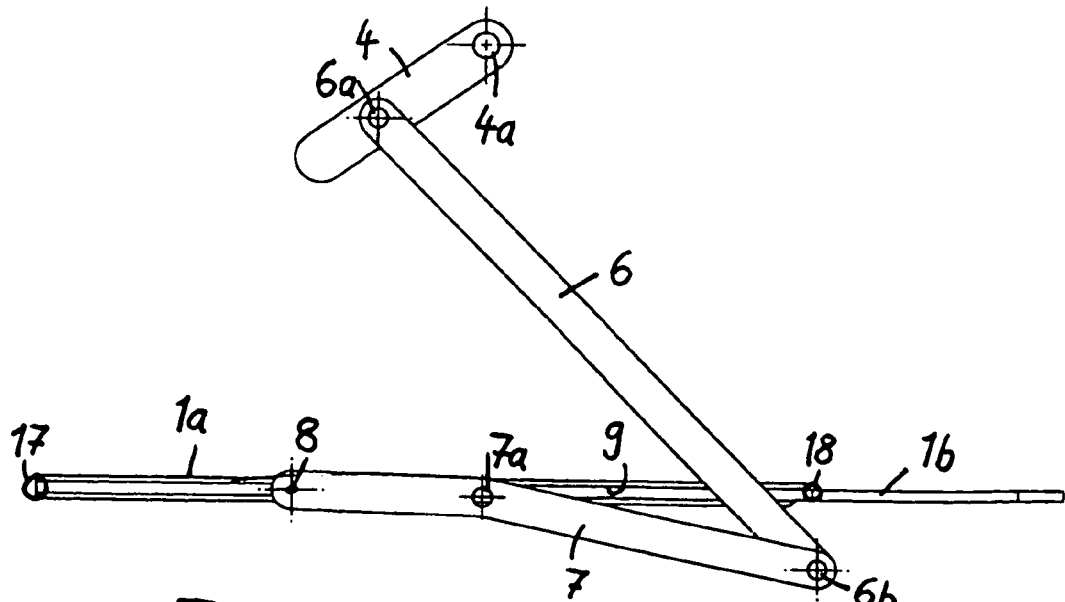
FIG. 5 shows the roof storage compartment cover in the closed position wherein the operating mechanism is in a position corresponding to the storage position of the roof in the storage compartment.

FIGS. 2–5 show schematically the roof storage compartment cover with its operating mechanism, the over-dead center operating structure and the main operating arm of the roof operating mechanism during the transfer of the vehicle roof, from the closed to the storage position. During the transfer movement, the main operating arm of the roof operating mechanism about its pivot joint 4a at the vehicle body is pivoted by almost 180° in the direction as indicated by the arrow 16. The main operating arm 4 executes a pivot movement in only one direction whereas the roof storage compartment cover is raised from its closed position to a maximum raised open position, whereupon the movement of the roof storage compartment cover is reversed and the storage compartment cover is lowered until it reaches again its closed position. The reversal of the movement direction of the roof storage compartment cover occurs when the over-dead center operating mechanism for the transfer link 6 passes through the dead center position as shown in FIG. 4. In an intermediate position of the main operating arm 4 between the closed and the storage position of the roof, the vehicle body pivot joint 4a of the main operating arm 4, the pivot joint 6a between the main operating arm 4 and the transfer link 6 and the operating arm 7 are disposed on a straight line as shown in FIG. 4. In the dead center position, the roof storage compartment cover is in its maximum raised position, in which the front section 1a of the roof storage compartment cover is pivoted upwardly about the vehicle body pivot joint 17 to the maximum extent. After the dead center position is passed, the front section 1a of the roof storage compartment cover is again pivoted downwardly toward its closed position.

The rear sections 1b of the roof storage compartment cover is joined to the front section 1a by the pivot joint 18. During the raising and lowering movement of the roof storage compartment cover, the rear section 1b if present is pivoted downwardly about its pivot joint 18 so that, in the fully open position of the roof storage compartment cover, it extends essentially straight downwardly. When the front section 1a is again lowered toward its closed position, the rear section 1b is again automatically leveled out until it reaches its essentially horizontal position in which the two sections 1a and 1b extend in a common plane.

What is claimed is:

1. A roof storage compartment cover (1) for a storage compartment (2) of a removable roof (3) of a vehicle having a vehicle body (5) on which said roof storage compartment cover (1) is pivotally supported, a roof storage compartment cover operating mechanism for moving the roof storage compartment cover (1) between a closed position and an open position, said roof storage compartment cover operating mechanism including an over-dead center operating structure, with which the vehicle roof (3) is mechanically coupled such that the roof storage compartment cover operating mechanism is movable between its closed and open positions depending on the transfer movement of the vehicle roof (3) wherein the direction of movement of the roof storage compartment cover (1) during the transfer of the vehicle roof (3) from the closed position to the storage position is reversed so that the roof storage compartment cover (1) is closed in the closed position and also in the storage position of the vehicle roof (3) but is open in an intermediate position of the vehicle roof (3), said over-dead center operating structure including a transfer link (6) connected between a pivotal operating arm (4) of said roof operating mechanism and said over-dead center operating structure such that, in the open position of said roof storage compartment cover said pivotal operating arm (4) of said roof operating mechanism and said transfer link (6) are in a dead center position, and said transfer link (6) being connected with its end remote from the operating arm (4) of the roof operating mechanism pivotally to a control arm (7) of the roof storage compartment cover operating mechanism, which is pivotally mounted on the vehicle body and which, at its end remote from the transfer link (6), is slidably supported in a guide track (9) on the roof storage compartment cover (1).

2. A roof storage compartment cover according to claim 1, wherein said pivotal operating arm (4) of said roof operating mechanism which is engaged by the transfer link (6) is pivotally supported on the vehicle body.

3. A roof storage compartment cover according to claim 1, wherein said roof storage compartment cover (1) is supported so as to be pivotable about a pivot axis (8) which is disposed at the end thereof adjacent the interior vehicle space.

4. A roof storage compartment cover according to claim 1, wherein said roof storage compartment cover comprises a rear section (1b) and a front section (1a) which are joined pivotally and the movements of the front and rear sections relative to each other are coupled.

5. A roof storage compartment cover according to claim 4, wherein, with the roof storage compartment cover (1) open, the front section (1a) is pivoted upwardly about its front end and the rear section (1b) is pivoted downwardly from the front section (1a).

6. A roof storage compartment cover according to claim 4, wherein said roof storage compartment is part of a vehicle trunk with a trunk lid (13) and the roof storage compartment cover (1) forms an intermediate bottom between a trunk bottom and a trunk lid (13).

7. A roof storage compartment cover according to claim 1, wherein said roof storage compartment cover (1) is removable.

* * * * *